United States Patent [19]

Gombert

[11] Patent Number: 4,539,038

[45] Date of Patent: Sep. 3, 1985

[54] DEVICE ENSURING PERMANENT NUTRITION OF POT PLANTS

[75] Inventor: Jean-Marie Gombert, Mignaloux-Beauvoir, France

[73] Assignee: Airwick AG, Basel, Switzerland

[21] Appl. No.: 488,247

[22] Filed: Apr. 25, 1983

[30] Foreign Application Priority Data

Feb. 9, 1982 [CH] Switzerland .................. 5225/82

[51] Int. Cl.³ .................. A01N 25/00; A01B 79/00
[52] U.S. Cl. .................. 71/64.11; 47/1 R; 47/9; 47/58; 47/DIG. 4; 71/64.13; 71/904
[58] Field of Search .................. 71/64.11, 904, 64.13; 47/1 R, 9, 58, DIG. 4

[56] References Cited

U.S. PATENT DOCUMENTS

| | | | |
|---|---|---|---|
| 2,038,019 | 4/1936 | Wright | 47/9 |
| 3,299,566 | 1/1967 | MacMullen | 47/1 |
| 3,384,993 | 5/1968 | Kane | 47/58 |
| 3,769,748 | 11/1973 | Goldring | 47/38.1 |
| 3,993,831 | 11/1976 | Vassiliades | 428/307 |
| 4,131,648 | 12/1978 | Choi et al. | 424/22 |

FOREIGN PATENT DOCUMENTS

| | | | |
|---|---|---|---|
| 1399822 | 7/1975 | United Kingdom | 71/904 |
| 2069926 | 9/1981 | United Kingdom . | |

*Primary Examiner*—Arthur P. Demers
*Attorney, Agent, or Firm*—Harry Falber

[57] ABSTRACT

Device for the permanent nutrition of pot plants and containing a granulated slow-release fertilizer comprising at least one fertilizing element selected from nitrogen, phosphorus and potassium, consisting of a flat support, on the upper surface of which adhere the granules, and a water-permeable sheet covering the flat support so as to enclose the granules.

16 Claims, No Drawings

DEVICE ENSURING PERMANENT NUTRITION OF POT PLANTS

The present invention concerns a device designed to ensure the permanent and regular nutrition of pot plants over a long period.

There are, on the market, a large number of slowly-diffusing fertilisers either in the form of granules or of small rods. However, the use of these products leads to unsatisfactory results or presents difficulties in operation; in effect, the rodlets which are used uniformly and slightly sunken in the soil of the pot feed only the favoured part of the soil where they are found and only the roots adjacent to this part receive the fertilising elements arising from the rodlets; moreover, taking into account the necessarily small size of the rodlet, the quantity of fertiliser available is relatively minor and results in limited duration of action. The granules, which are placed on the surface of the soil, are not irrigated by the water contained in it, except during the very short watering time, and their yield is therefore very low; a good yield can be obtained by distributing the granules in a homogeneous manner in the soil but this necessitates tipping out the soil and mixing it with the granules, which is hardly appropriate in places where pot plants are usually situated; one can well understand that the owners of pot plants do not like the thought of this operation.

It was found that an action of long duration and excellent regularity can be obtained in the nutrition of pot plants, starting from slow-release granules, if these are distributed and fixed on a surface placed under the pot. This method, whatever the manner of watering adopted, be it from above the pot, be it from below the pot and whatever the degree and frequency or watering, maintains excellent nutrition over a long period.

The invention therefore aims at a device designed to provide permanent nutrition of the pot plant and contains a granulated slow-release fertiliser comprising at least one fertilising element selected from nitrogen, phosphorus and potassium, the said device being characterized in that it is formed from a flat support, on the upper face of which the granules adhere, and a water-permeable sheet covering the flat support in such a way that the granules are enveloped.

By slow-release fertiliser granules it is intended here to refer to a fertiliser capable of liberating, under the action of water, progressively and over at least several days, one or more water-soluble fertilising elements; such a fertiliser consists of e.g. a water-soluble fertiliser held behind a barrier which is only slightly permeable to water; it can also consist of one or more substances which are insoluble in water but which degrade slowly in contact therewith, in soluble fertilising substances.

As water-soluble fertilisers, there may be mentioned e.g. urea and its soluble derivatives, the salts formed from nitric acid and/or phosphoric acid, on the one hand, and alkaline and/or ammonium ions, on the other hand, and the salts formed from agriculturally-acceptable acids or precursors thereof, on the one hand, and potassium and/or ammonium ions, on the other hand.

As water-insoluble substances capable of degrading in soluble fertilising substances, there may be mentioned, e.g. the following: compounds substantially polymerised and formed from urea and formaldehyde; substantially polymerised compounds formed from urea and acetaldehyde; substantially polymerised compounds formed from urea and isobutyraldehyde; substantially polymerised compounds formed from urea and crotonaldehyde; substantially polymerised compounds formed from urea and glyoxal; cyanuramide; ammoniated leonardite; ammonium polyphosphates; metallic ammonium phosphates and phosphazenes.

When the fertiliser is held behind a barrier which is only slightly permeable to water, this can be a simple covering of a nucleus of fertiliser containing the fertilising elements, or form together a bond uniting various agglomerated particles, similar or different, constituting the nucleus. The permeability of the barrier may reside in a natural porosity of the barrier material or in an artificial porosity provoked by, e.g. the inclusion, in an impermeable material, of the finely-pulverized soluble salts or of porous particles.

As materials usable to form the barrier, there may be mentioned, e.g., the following—used alone or in combination: synthetic homopolymers and copolymers; natural hydrophobic products e.g. asphalts, waxes, fats, oils, paraffins and their derivatives; elemental sulphur and compositions containing materials used in the pharmaceutical industry for producing implants and enteric pills.

In the device according to the invention, it is the coating enveloping the granules which acts as a semipermeable membrane ensuring the progressive liberation of the fertiliser elements.

A suitable amount of fertilising elements can be readily fed as required to the plant when the quantity and weight of the granules contained in the device are known.

A known technique for use with pesticides which are uniformly distributed over the surface of a water-soluble film enables a chemical composition to be automatically applied to a given surface (U.S. Patent Specification No. 3,299,566); in this case, it is the support itself which ensures the liberation of the elements by virtue of its degradation on contact with water.

The permeable sheet which covers the flat support and holds the granules can be rigid or supple, the latter being preferred. It can be naturally permeable or artificially so rendered. A naturally permeable sheet is e.g. selected from papers preferably non-sized, felts, non-woven fabrics, tissues, natural or synthetic sponges and fused polymers. The permeable sheet is preferably selected from the non-woven fabric; there are preferably used in the device according to the invention synthetic fibres (polyester, viscose . . . ) which, compared with natural fibres, have the advantage that they do not decompose when held in water for prolonged periods, and that they ensure a good capillary ascension of the water as medium for pesticides.

The use of permeable sheets consisting of synthetic substances is similar to the method used in the horticultural field for the maintenance of a good level of moisture under the pots, together with good capillary ascension of the water (G.B. Patent Specification No. 2,069,926). This technique is applied exclusively for the automatic watering of large numbers of plants, such as are found on greenhouse shelves, and not for the care or treatment of the plants by the provision of chemical substances dissolved in the water.

A naturally impermeable sheet can be rendered permeable by multiple perforations; such a sheet is selected from elastomeric or plastomeric material films e.g. the polyalkylenes, polybutadienes, polyvinyl chlorides, polyacrylonitriles, polystyrenes and rubbers.

The thickness of the permeable sheet is not critical and depends above all on its nature. A perforated, naturally impermeable sheet has, preferably, a thickness between 0.02 and 1 mm and, more preferably, between 0.05 and 0.5 mm; a naturally permeable sheet has, preferably, a thickness from 0.1 to 20 mm, more preferably, from 0.3 to 10 mm.

The flat support can be rigid or supple; it is preferably permeable to water or so rendered and, in that case, it can be of the same nature as the permeable sheet.

In the device according to the invention, it is not essential to provide an upper permeable surface; however, the product is then more fragile and is unattractive. The fertiliser granules can become detached from the flat carrier during transport and subsequent handling. In addition, there is the risk of damage to the permeation barrier for the granules caused by the underneath parts of the pots.

When the flat support is impermeable to water, it can be selected from all the materials capable of being produced as thin sheets e.g. aluminum, plastomeric or elastomeric materials and pasteboard coated with a hydrophobic covering. The flat support can also be formed by an impermeable sheet coated internally with a permeable sheet selected from naturally permeable ones.

The thickness of the flat support is not critical and depends principally on its nature. If the flat support is impermeable to water, its thickness is preferably from 0.05 to 1 mm, more preferably from 0.1 to 0.5 mm. If the flat support is permeable to water, the material(s) which constitute it are preferably selected from those set out above for the naturally permeable sheet and its thickness is preferably from 0.1 to 20 mm, more preferably from 0.3 to 10 mm.

The flat support and the permeable sheet have, preferably, an identical shape, their dimensions being approximately the same, those of the permeable sheet can, however, be less than those of the support. The shape of the flat support and of the permeable sheet, is not critical; it can be, notably, triangular, square, polygonal in any way, round or elliptical, the said shape and its dimensions being preferably adapted to those of the base of the pot under which the device is designed to be placed, a device being conceived, however, for receiving an assembly of pots; one can thus understand that the surface of the device will have advantageously one surface comprising from 50 to 1000 cm$^2$; this surface preferably comprising from 100 to 500 cm$^2$.

In the case of square or round shaped devices, its side or diameter is preferably from 7 to 30 cm, more preferably from 10 to 25 cm.

According to one interesting embodiment, the flat support, when it is impermeable and rigid, can possess, on its circumference, an upwardly directed rim to impart to the device the shape and the use of a cup, saucer or basin, designed to receive the pot containing the plant, or several pots.

The use of a permeable sheet or of a plastics film as the support for fertiliser elements is similar to that applying in the agricultural field (U.S. Pat. No. 3,384,993) for various purposes (straw, reduction in the loss of water from the soil as a result of leaching out and evaporation, means of preventing the emergence of weeds, provision of fertiliser elements intimately combined with a water-soluble film); however, this technique in agriculture is designed for large surface areas.

The granules of slow-release fertiliser are preferably distributed on the upper face of the flat support in a regular manner without, however, this regularity having a critical character. The granules need not occupy all the surface of this face, the surface occupied being certainly a function of the quantity of granules present. When all the surface is occupied, the layer of granules can be single or multiple; if it is multiple, the granules of the upper layer(s) adhere to granules of the lower layer, the adhesive used may be the same or different from the agent used to fix the lower layer on the flat support.

The adhesive used for fixing the granules on the flat support are all those known in the industry. They are used as they occur (e.g. glue or egg white), in molten state (e.g. hot-melt resins, asphalts or waxes), in solution in water or in an organic solvent.

Among convenient adhesives, there may be mentioned e.g. the following: natural sizes and glues, such as bone size, fish size, skin size, casein glue, flox glue, rosin glue, marine glue, holly glue, mistletoe glue, English size, Flanders size, ossein size and Russian size; animal or vegetable protein, gelatines, albumins and caseins; sugars such as saccharose, glucose and honey; polysaccharides such as starch and its water-soluble derivatives, the alginates, the carrageinates, dextran, dextrin, pectin, chitin and its water-soluble derivatives, gum arabic, caroubier gum, guar gum, Indian gum, kasaya gum, lacquer gum, larch gum, Senegal gum, Tamarind gum, tragacanth gum, xanthane gum, methyl celluloses, hydroxyalkyl celluloses, carboxymethyl celluloses and cellulose esters; asphalts, waxes and paraffins; rubbers such as latex, polybutadienes, polyisoprenes and polychloroprenes; sodium silicate; synthetic homopolymeric or copolymeric waxes and resins such as the polyalkylenes, polyvinyl alcohols, polyvinyl esters, polyvinyl ethers, polyvinyl acetals, polystyrenes, polyvinyl pyrrolidones, polyacrylic esters, polymethacrylic esters, polyallylic esters, polycaprolactams, polyhexamethylene adipamides, polymethylene sebacamides, polyurethanes, polyacrylonitriles, ureaformaldehyde resins, urea-melamines, phenol-formaldehyde and phenol-butyraldehyde, epoxide resins, maleic polyesters, phthalic polyesters and abietic polyesters.

Preferred adhesives are water-soluble. The adhesives can contain a plasticizer; when it is present, this is selected from those suitable for the chosen adhesive and, if a solvent is used, from the plasticizers soluble in this solvent.

As plasticizers, there may be mentioned principally, the adipates, dibutyl, dihexyl, dicyclohexyl, dioctyl, didecyl or diphenyl phthalates and sebacates; isopropyl, butyl and isobutyl myristates, palmitates and stearates; triphenyl, tricresyl, tributyl, trihexyl, tricyclohexyl, trioctyl, tridecyl and tridodecyl phosphates; polyethylene glycols; polypropylene glycols; polybutylene glycols; mono-, di- and tri-esters formed from glycerol and fatty carboxylic acids; esters formed from lower alkanols and citric acid; the condensation products of ethylene or propylene oxide on to alkylphenols, on to fatty alcohols and on to vegetable oils. When the adhesive is water-soluble and a plasticizer is used, the latter is preferably selected from those which are soluble in water.

The device according to the invention can optionally comprise, in addition to the fertiliser granules, one or more other active agents for the plants selected from the trace-elements, algicides, fungicides, insecticides, nematocides and growth regulators. These active agents, when present, can also be used as slow-release granules.

The adhesive designed to fix the fertiliser granules and possibly the other type(s) of granule, is preferably deposited on the flat support prior to putting the granules in place; however, it can also be applied when the granules are already in place or at the same time as they are put in place, which is not particularly inconvenient in the special case where the adhesive is water-soluble. According to one advantageous embodiment, the adhesive is identical to the barrier which envelops the granules and the constitution of this barrier is produced approximately at the same time as the granules are put in place and fixed.

The application of the adhesive can be effected by all known industrial means such as, e.g., by brush coating and/or by roller, spraying, pulverisation under pressure and steeping; as is well known, one can apply the adhesive before the cutting of the flat support to its shape and to its specific dimensions, using e.g. the long length band on which the adhesive is applied continuously. If the adhesive is in solution in water or in an organic solvent, the application is followed by complete or partial drying by heating and/or by ventilation. If the adhesive is applied at a temperature above the ambient temperature so that it melts or fluidises, the application is followed by cooling. If the adhesive is a solid material which needs to be melted to fix the granules, it can be applied as a powder or as platelets on to the surface of the flat support and melted by heating on this surface; an advantageous variation, in this latter case, consists in simultaneously applying the granules to be fixed and the adhesive in finely-divided solid state on to the flat support which has been heated before, during or after this application.

The granules are applied and distributed on the flat support by any known industrial means such as e.g. by vibrating or non-vibrating sieve distributor dosers; the flat support can be placed on a vibrating table to obtain or facilitate the homogeneous distribution of the granules over all the surface of the flat support.

The permeable sheet is made integral with the device either by fixation on the granules or by fixation on the flat support. The fixation on the granules is effected with the aid of an adhesive which is advantageously the same as that used for fixing the granules on the flat support; the adhesive is preferably applied on to the lower-surface of the permeable sheet by one of the methods already cited; it can also be applied on to the granules prior to the setting up of the permeable sheet; according to one advantageous variation, the fixing of the granules is made simultaneously on the flat support and on the permeable sheet using one of the methods already indicated.

When the permeable sheet is fixed on the flat support, this fixation is preferably effected over all its circumference; the fixation is effected by any known method such as the cold or hot cementing, soldering, clamping and sewing; one interesting soldering method of fixation consists in effecting, by heating the circumference, the fusion of the adhesive and/or the material constituting the flat support and/or the material constituting the permeable sheet.

Depending on the nature of the materials constituting the flat support and the permeable sheet and the mole of fixing the latter, the device according to the invention can advantageously be in the form of a disc, a cushion, a couch or a dish, this latter optionally having internal padding.

The device according to the invention can be used with all types of pots whatever the nature of the material comprising the pot, the essential condition being that the underside of the pot has a porous structure and/or is pierced by at least one orifice.

I claim:

1. A plant feeding device comprising a flat support, at least one granulated slow-release fertilizing element selected from the group consisting of nitrogen, phosphorus and potassium releasing materials adhered to the upper face of said support and a water-permeable sheet covering the granules and the flat support so that the granules are enveloped.

2. Device according to claim 1 characterized in that the granulated slow-release fertiliser consists of a water-soluble fertiliser nucleus surrounded by a barrier only slightly permeable to water.

3. Device according to claim 2 characterized in that the water-soluble fertiliser contains at least one fertilising composition selected from the group consisting of urea and its soluble derivatives; alkali and ammonium salts formed from nitric acid or phosphoric acid, and ammonium and potassium salts formed from agriculturally acceptable acids or precursors thereof.

4. Device according to claim 2 characterized in that the barrier is selected from synthetic homopolymers and copolymers, natural hydrophobic products, elemental sulphur and compositions containing it and materials used in the pharmaceutical industry for producing implants and enteric pills.

5. Device according to claim 1 characterized in that the granulated slow-release fertiliser consists of one or more substances which are insoluble in water but which degrade slowly in contact with it, in water-soluble substances.

6. Device according to claim 5 characterized in that the insoluble substance is selected from the group consisting of cyanuramide, ammoniated Leonardite, metallic ammonium phosphates, phosphazenes and substantially polymerized compositions formed from urea and formaldehyde, acetaldehyde, isobutyraldehyde, crotonaldehyde or glyoxal.

7. Device according to claim 1 characterized in that the permeable sheet is selected from papers, felts non-woven fabrics, tissues, natural or synthetic sponges, fused polymers, and perforated films of plastomeric or elastomeric material.

8. Device according to claim 7 characterized in that the permeable sheet is a non-woven fabric selected from normal voile or voile reinforced by fibres obtained by the dry or wet method, and those produced by aiguilletage.

9. Device according to claim 1 characterized in that the flat support is selected from papers, felts, non-woven fabrics, tissues, natural or synthetic sponges, fused polymers, films of plastomeric or elastomeric materials, aluminium and pasteboard coated with a hydrophobic covering.

10. Device according to claim 9 characterized in that the flat support is impermeable and rigid and has, on its circumference, an upwardly directed rim.

11. Device according to claim 1 characterized in that the granules are fixed on the flat support by means of an adhesive.

12. Device according to claim 1 characterized in that the permeable sheet is fixed on the fertiliser granules by means of an adhesive.

13. Device according to either claim 11 or claim 12 characterized in that the adhesive is selected from natural sizes and glues, animal and vegetable proteins, gelatines, albumins, caseins, sugars, polysaccharides, asphalts, waxes, paraffins, natural or synthetic rubbers, sodium silicate and synthetic homopolymeric or copolymeric waxes and resins.

14. Device according to claim 13 characterized in that the adhesive is water-soluble.

15. Device according to claim 1 characterized in that the permeable sheet is fixed, by its circumference, on the circumference of the flat support.

16. Device according to claim 1 characterized in that it comprises slow-release granules other than the fertiliser and selected from those containing one or more of trace elements, algicides, fungicides, insecticides, nematocides and growth regulators.

* * * * *